G. BELFILS.
ALTERNATING CURRENT GENERATOR AND GROUP CONVERTER.
APPLICATION FILED SEPT. 5, 1917.

1,270,687.

Patented June 25, 1918.

Inventor:
Georges Belfils
per H. W. Plucker
Attorney.

UNITED STATES PATENT OFFICE.

GEORGES BELFILS, OF PARIS, FRANCE.

ALTERNATING-CURRENT GENERATOR AND GROUP-CONVERTER.

1,270,687.   Specification of Letters Patent.   Patented June 25, 1918.

Application filed September 5, 1917. Serial No. 189,864.

*To all whom it may concern:*

Be it known that I, GEORGES BELFILS, a citizen of the French Republic, residing at 10 Rue Auber, Paris, in the Republic of France, have invented certain new and useful Improvement in Alternating-Current Generators and Group-Converters, of which the following is a specification.

With the manifold uses of alternating currents for wireless telegraphy and telephony on aerial engines, flying machines, dirigibles, vehicles and boats, manufacturers have been led to construct alternators of reduced weight and bulk. Now the use of a separate exciter or of a continuous current impulse motor results in an assemblage which takes up a lot of space and is costly to carry out in the case of very small machines, owing to the large number of parts constituting the whole.

The present invention, has for its object the construction of an alternator exciter machine or a group converter having an induction system common to the two machines.

Figure 1:
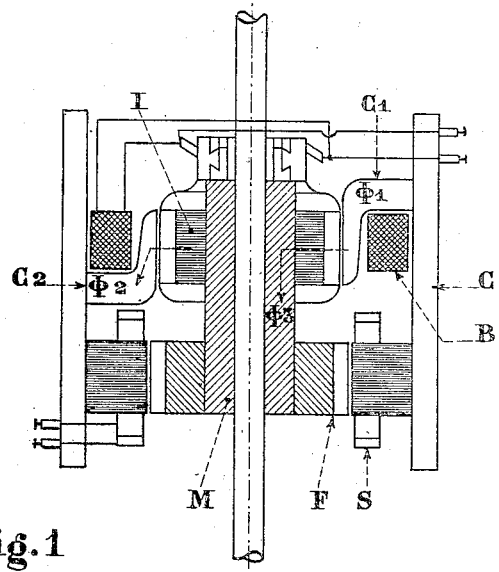
Figure 2:
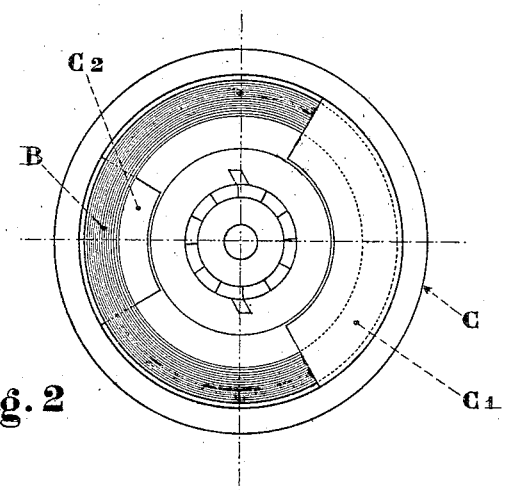

Figures 1 and 2 given by way of example show a diagrammatic section of the machine in elevation and side view.

The alternator is of the homopolar type with a toothed rotor F mounted upon a sleeve M or keyed directly on to the shaft if this latter is of sufficient diameter; the sleeve M likewise carries the armature I of the continuous current machine. The stator of the alternator is shown at S.

The continuous current armature is mounted in a frame C having two polar extensions C' and C2 if the continuous current machine is bipolar. A field coil B surrounds the two polar extensions C' and C2. Under these conditions the total flux $\Phi_1$ produced by the coil B passes through the piece C' and is then divided on the one hand into a flux $\Phi_2$ in the piece C2 and on the other hand into a flux $\Phi_3$ along the magnetic circuit of the alternator, comprising the sleeve M, the rotor F and the stator S.

The coil B is connected to the brushes of the continuous current armature.

In the case of the group converter, the flux $\Phi_2$ may be great compared with $\Phi_3$ and by suitably saturating the piece C2 to increase its magnetization it is possible to regulate the electromotive force of the alternator without greatly varying the speed of the group converter.

Furthermore the polar surface of the piece C2, will be smaller than the polar surface of C1, so that the magnetic attractions produced by the fluxes $\Phi_1$ and $\Phi_2$ which are unequal, balance each other.

It is possible, also, to this end, to make the induction system of the continuous current machine multipolar instead of bipolar. In the case where the continuous current machine is a simple exciter and the alternator is of lower power, it is possible for the sake of simplicity to dispense with the piece C2, the flux of the alternator being quite sufficient for the exciter and this flux not being sufficiently important to produce a mischievous magnetic attraction.

Again in this case the continuous current machine my have in it two or more poles of the same polarity.

What I claim and desire to secure by Letters Patent of the United States is:—

In combination a homopolar alternating current machine having a rotor mounted upon a shaft, a continuous current machine having its armature mounted upon the same shaft, a single frame in which is mounted both the stator of the alternating current machine and the pole pieces of the continuous current machine and a field coil common to both machines, substantially as described.

In testimony whereof I affix my signature in presence of two witnesses.

GEORGES BELFILS. [L. S.]

Witnesses:
 E. PERTANI,
 JOSEPH GEMENIE.

Copies of this patent may be obtained for five cents each, by addressing the "Commissioner of Patents, Washington, D. C."